US 6,573,707 B2

(12) United States Patent
Kiriyama et al.

(10) Patent No.: US 6,573,707 B2
(45) Date of Patent: Jun. 3, 2003

(54) DISPLACEMENT DETECTING DEVICE POWER SUPPLY AND DATA COMMUNICATION DEVICE

(75) Inventors: Tetsuro Kiriyama, Kawasaki (JP); Toshitaka Shimomura, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/943,125

(22) Filed: Aug. 30, 2001

(65) Prior Publication Data

US 2002/0024335 A1 Feb. 28, 2002

(30) Foreign Application Priority Data

Aug. 30, 2000 (JP) ......................... 2000-260829

(51) Int. Cl.$^7$ .............. G01B 7/00; G01B 7/14; G01D 5/20
(52) U.S. Cl. .............. 324/207.17; 324/207.24; 336/45; 336/115; 340/870.32
(58) Field of Search ............ 324/207.15–207.19, 324/207.24; 336/45, 115, 116, 118, 130, 131; 340/870.32, 870.33, 870.35, 870.36

(56) References Cited

U.S. PATENT DOCUMENTS

| 3,758,845 | A | * | 9/1973 | Mac Kelvie et al. ... 340/870.32 |
| 4,682,104 | A | * | 7/1987 | Lombard et al. ...... 324/207.17 |
| 6,049,204 | A | * | 4/2000 | Andermo et al. ...... 324/207.17 |
| 6,313,624 | B1 | * | 11/2001 | Alhorn et al. ......... 324/207.17 |

FOREIGN PATENT DOCUMENTS

JP          10-318781          12/1998

* cited by examiner

*Primary Examiner*—Gerard R. Strecker
(74) *Attorney, Agent, or Firm*—Rankin, Hill, Porter & Clark LLP

(57) ABSTRACT

A scale and a detecting head each include input/output connectors. Either of the input/output connectors is connected to receiving-side connector. By connecting the receiving-side connector to either of the scale and the detecting head, which is fixed in use, there is no change that a receiving-side cable will be disconnected by movement of the counterpart of the fixed member. This results in improvement of the reliability. Additionally, device is operable at high speed since the cable does not restrict motion of the movable member.

16 Claims, 11 Drawing Sheets

DISPLACEMENT DETECTING DEVICE POWER SUPPLY AND DATA COMMUNICATION DEVICE

BACKGROUND OF THE INVENTION

1. Field of the Invention

The present invention relates to a displacement detecting device that detects relative displacement between two members.

2. Description of the Related Art

In an industrial field, an instrument, such as an electronic caliper, is widely used for measuring a thickness of an object or other physical dimensions. A displacement detecting device (transducer) is used as one of the components forming the instrument. Of these known displacement detecting devices, an induction type of displacement detecting device detects a relative position between a detecting head, called a grid, and a scale by the utilization of an electromagnetic induction. In the displacement detecting device, current is fed to a magnetism generator contained in the detecting head so that a magnetic field is generated. The magnetic field generated is linked to a coil extending over the entire length of the scale, whereby the coil generates a voltage. The generated voltage is detected in the form of a signal by a magnetic flux sensor provided on the scale. The voltage induced in the magnetic flux sensor varies with a relative position between the detecting head and the scale. Accordingly, the relative position between the detecting head and the scale may be detected from the induced voltage signal. The displacement detecting device thus arranged needs two cables, one for feeding current to the detecting head and the other for transferring the signal from the scale. The work of separately connecting the cables to both the detecting head and the scale is troublesome.

In the displacement detecting device disclosed in Japanese Patent Unexamined Publication No. Hei. 10-318781 proposed by the applicant of the present patent application, only a magnetic flux coupling loop is provided on the scale. The magnetism generator and the magnetic flux sensor are both provided on the detecting head. A current feeding cable and a signal cable are bundled into a single cable, and the single cable is soldered to the detecting head. A primary magnetic flux generated by the magnetism generator of the detecting head induces a current in the magnetic flux coupling loop of the scale. The induced current generates a secondary magnetic flux. The secondary magnetic flux induces a voltage in a detecting coil of the magnetic flux sensor of the detecting head.

In the displacement detecting device arranged such that the scale is fixed to a fixing member, and the detecting head is fixed to a movable member, and a displacement of the detecting head relative to the scale is measured, the cable is bent with the movement of the detecting head. The bending of the cable possibly causes troubles, such as cable disconnection. The weight of the cable will hinder the operation of a high speed device, such as a linear-motor driven device. The conventional countermeasure for this problem is to frequently replace the cable with a new one, and to use a thin and tough cable. Unfortunately, this countermeasure is cumbersome for the user.

SUMMARY OF THE INVENTION

Accordingly, an object of the present invention is to provide a displacement detecting device that is free from the cable disconnection resulting from the movement of the detecting head, and does not hinder the high-speed operation of the device.

In accordance with the present invention, a displacement detecting device is provided for detecting a relative displacement between a first member and a second member. The first and second members, respectively, include output connectors for outputting a displacement signal on the basis of the relative displacement, and each output connector is fit to a common receiving-side connector.

In the displacement detecting device, at least one of the output connectors of the first or second members may be selected as a counterpart connector of the receiving-side connector, depending on the mounting space available. This feature provides several advantages when either of the first and second members, which is fixed in use, is connected to the receiving-side connector. One advantage is that there is no chance of the receiving-side cable for the receiving-side connector being disconnected by movement of the counterpart of the fixed member. This results in improvement of the reliability. An additional advantage is that the device is operable at high speed since the cable does not restrict motion of the movable member.

In the above-mentioned displacement detecting device, it is preferable that the first member include a displacement signal generating section for generating the displacement signal on the basis of the relative displacement and a transmitting circuit for transmitting the displacement signal. It is also preferable that the second member include a receiving circuit for receiving the displacement signal from the transmitting circuit.

The displacement signal generating section of the first member generates the displacement signal on the basis of the relative displacement. The displacement signal is transmitted to the second member by use of the transmitting circuit and the receiving circuit. In the displacement detecting device, the device construction is advantageously simplified. The signal transmission between the transmitting circuit and the receiving circuit may be made by use of non-contact transmitting means, which use a radio wave signal, an optical signal or the like. Contact transmitting means that use an electrical signal based on the electrical contact may be used in place of the non-contact transmitting means. The use of electromagnetic induction is more preferable. A wire communication may also be used for the data transmission between the first and second members within the scope of the invention.

In the above-mentioned displacement detecting device, it is also preferable that the first and second members each include displacement signal generating sections for generating the displacement signal based upon the relative displacement.

The first and second members each include displacement signal generating sections for generating the displacement signal on the basis of the relative displacement. Accordingly, the displacement signal may be derived from either of the displacement signal generating sections. This feature brings about the following advantages when either of the first and second members, which is fixed in use, is connected to the receiving-side connector. There is no chance that the receiving-side cable for the receiving-side connector will be disconnected by movement of the counterpart of the fixed member. This results in improvement of the reliability. Additionally, the device is operable at high speed since the cable does not restrict motion of the movable member.

In the above-mentioned displacement detecting device, it is preferable that at least one of the first and second members includes a power supplying section for supplying electric power from one of the first and second members to the other of the first and second members.

In the displacement detecting device, the power supplying section, which is provided on one of the two members, supplies electric power from one member to the other member. The other member is driven by the received electric power, and performs the displacement detecting operation. Accordingly, there is no need to use the cable for supplying electric power to the other member. The power supplying section may use the non-contact transmitting means based on electromagnetic induction or the contact transmitting means based on electrical contact. In either case, electrical power may be supplied in every attitude of the movable member before and after it is displaced. Further, the electrical power may be supplied to the movable member only when it takes a specific attitude.

In the above-mentioned displacement detecting device, it is preferable that each of the output connectors include a signal terminal and a power feeding terminal.

In the displacement detecting device, in a case where the receiving-side connector is connected to the output connector of the first member and also in a case were it is connected to the output connector of the second member, the electrical connection for outputting the displacement signal and the electrical connection for feeding electric power are made in one operation.

The above-mentioned object also can be achieved by a displacement detecting device for detecting a relative displacement between a detecting head and a scale extending over and confronted with the entire range of a locus representative of a movement of the detecting head. In accordance with the invention, the scale includes a connector incorporating therein an input terminal for feeding electric power to the detecting head and an output terminal for deriving a displacement signal from the detecting head.

In the displacement detecting device, when the receiving-side cable for the receiving-side connector is connected to the connector of the scale, the following advantages are obtained. There is no chance that the receiving-side cable will be disconnected by movement of the detecting head. This results in improvement of the reliability. Additionally, the device is operable at high speed since the cable does not restrict motion of the detecting head.

Further, the above-mentioned object can be achieved by a displacement detecting device for detecting a relative displacement between a first member and a second member, wherein the first member includes a displacement signal generating section for generating a displacement signal on the basis of the relative displacement and a signal transferring section for transferring the displacement signal to the second member. The first and second members, respectively, include input/output connectors. Each of the input/output connectors is configured so as to be fit to a common receiving-side connector and has an exciting terminal for receiving an exciting signal and a signal terminal for outputting the displacement signal on the basis of the relative displacement. The output of the displacement signal generating section is branched and connected to the signal terminal and the signal transferring section, respectively.

The displacement detecting device is used in a state that the receiving-side connector is connected to either of the input/output connectors of the first and second members. In a case where the receiving-side connector is connected to the input/output connector of the first member, when an exciting signal is input to the device through the exciting terminal of the input/output connector, the displacement signal generating section generates the displacement signal based on the relative displacement between the first and second members. The displacement signal is output from the signal terminal of the input/output connector to the receiving-side connector. In a case where the receiving-side connector is connected to the input/output connector of the second member, when the displacement signal generating section of the first member generates the displacement signal, the displacement signal is transferred to the second member by the signal transferring section, and output by the receiving-side connector.

In the displacement detecting device, the output of the displacement signal generating section of the first member is branched and connected to the signal terminal of the input/output connector of the first member and the signal transferring section, respectively. In a case where the receiving-side connector is connected to the input/output connector of the first member and, also, in a case where the receiving-side connector is connected to the input/output connector of the second member, the displacement signal may be output via the receiving-side connector. Accordingly, an exciting circuit for generating the exciting signal and a receiving circuit for processing the displacement signal may be provided on an outside member not fixed to the first and second members. As a result, the first and second members may be constructed to be extremely small in size and heavy duty. Further, the device maintenance is easy.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
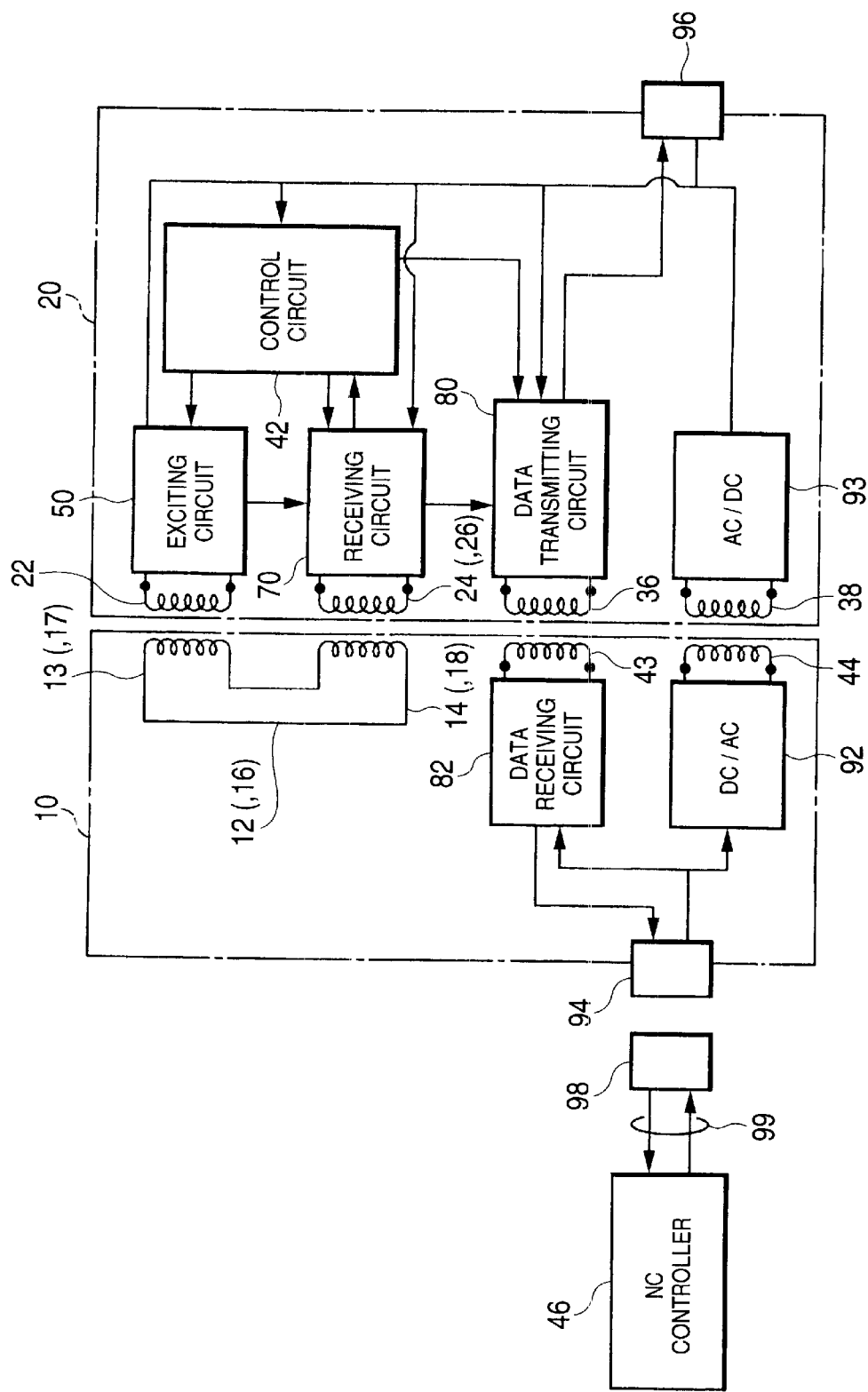
FIG. 1 is a block diagram showing a displacement detecting device according to a first embodiment of the present invention.

The preferred embodiments of the present invention will be described with reference to the accompanying drawings. In FIG. 1, a displacement detecting device according to a first embodiment of the present invention includes a scale 10 having first and second coupling loops 12, 16 and a detecting head 20, which is movable relative to the scale 10. Either of the scale 10 and the detecting head 20 is connected to a numeric controller (NC) 46, whereby a position of a movable part of a numerically controlled machine tool, for example, is detected.

Figure 2:
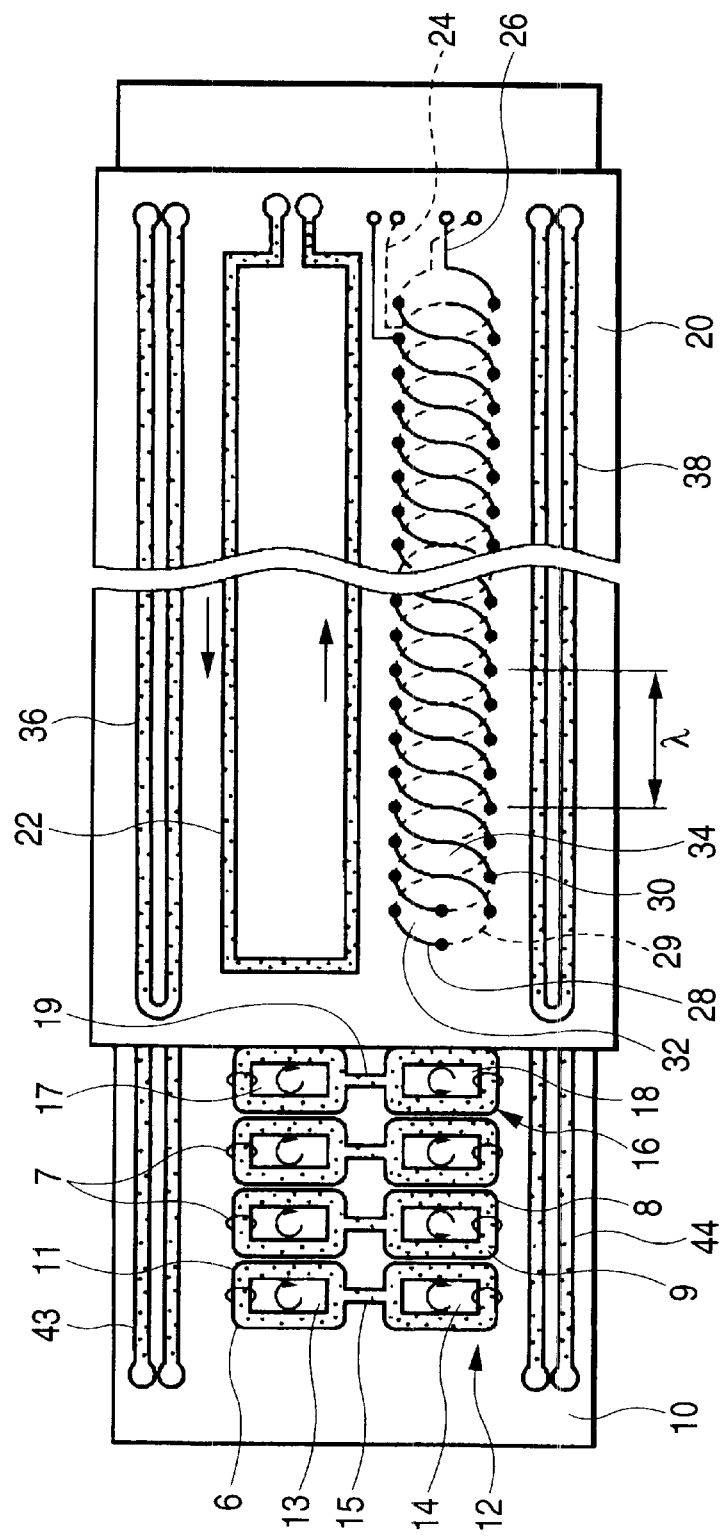
FIG. 2 is a plan view showing a key portion of the first embodiment.
Figure 3A:
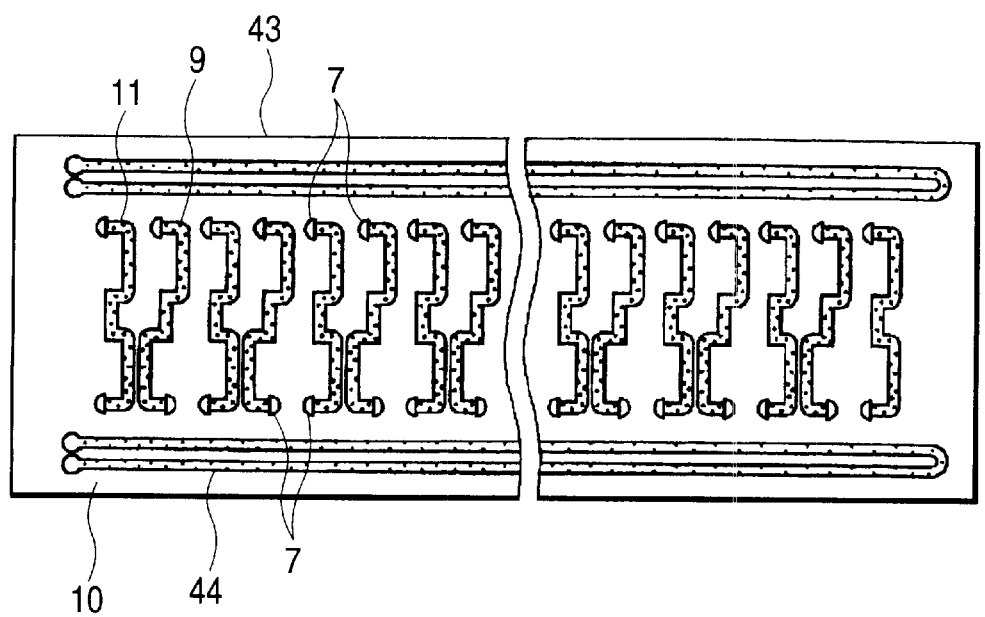
FIG. 3A is a plan view showing a first layer of a scale.
Figure 3B:
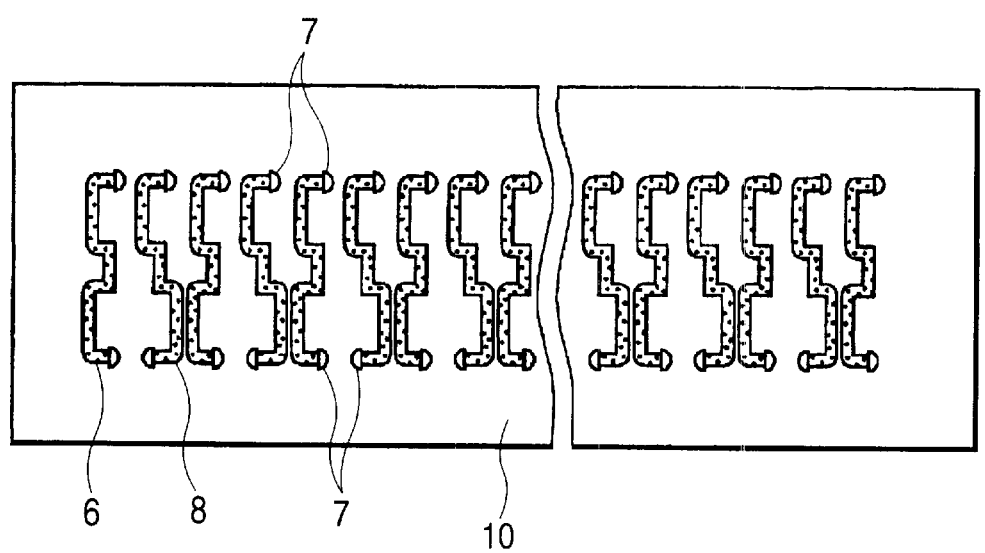
FIG. 3B is a plan view showing a second layer of the scale.

The scale 10 mainly contains a printed circuit board (PCB) consisting of two layers, referred to hereinafter as first and second layers. How those layers are layered is shown in FIG. 2, and the first and second layers are shown in FIGS. 3A and 3B, respectively. As shown in FIG. 2, patterns forming the first and second coupling loops 12, 16 are arrayed in the longitudinal direction of the-scale 10. The first coupling loop 12 includes a first loop part 13 and a second loop part 14 coupled to the first loop part by way of a connection wiring 15.

As shown in FIGS. 3A and 3B, individual parts 6, 8 and 9, 11 of the first and second patterns formed on the first and second layers of the PCB are connected by passing-through wires 7, thereby forming the first and second coupling loops 12, 16. The first loop part 13 and the second loop part 14, while not crossed, are coupled to each other so that the first loop part 13 generates a magnetic field whose polarity is the same as the polarity of a magnetic field generated by the second loop part 14. With reference again to FIG. 2, the second coupling loop 16 includes a first loop part 17 and a second loop part 18 connected to the first loop part by a cross wiring 19. The first loop part 17 and the second loop part 18 are mutually connected to each other so that the first loop part 17 generates a magnetic field whose polarity is opposite to the polarity of a magnetic field generated in the second loop part 18.

The detecting head 20 is formed with the second PCB and, as shown in FIG. 2, includes a transmission winding 22, and first and second receiving windings 24, 26. The transmission winding 22 takes a rectangular pattern. The transmission winding 22 covers a region of the first loop parts 13, 17 of the first and second coupling loops 12, 16, which region ranges over the length of the detecting head 20.

The first and second receiving windings 24, 26 each consist of first loop segments 28 and second loop segments 29. The first loop segments 28 are formed on one of the major surfaces of the PCB, and the second loop segments 29 are formed on the other major surface. The PCB layer provides electrical insulation between the first and second loop segments 28, 29. The terminals of the first loop segments 28 are connected to terminals of the second loop segments 29 by through wirings 30 formed in the PCB.

The first and second loop segments 28, 29 each have a pattern representative of a sinusoidal wave of a wavelength $\lambda$. The first receiving winding 24 (26) consists of a plurality of loops 32 (34). The loops 32 (34) of the first receiving winding 24 (26) have a width of $\lambda/2$ along the measurement axis. Coupling the adjacent loops 32, 34 forms one period of the sinusoidal wave of $\lambda$ in wavelength. In the receiving windings thus arranged, DC components superimposed on the signals of the first and second loop segments 28, 29 on the obverse and reverse surfaces of the PCB cancel each other at the time of the displacement detection. As a result, high precision detection is secured.

The second receiving winding 26 is offset from the first receiving winding 24 by $\lambda/4$ on the measurement axis. Hence, the first and second receiving windings 24, 26 are located in quadrants (placed in a state that the signals of those receiving windings are phase shifted by 90°). In the illustrated embodiment, the first and second receiving windings 24, 26 are arranged to have a two-phase construction. If required, those receiving windings may be arranged to have a three-phase construction by shifting the phases of the signals of those windings by 120°. In this case, if those phase windings are star-connected, the three-order higher harmonics may be removed.

The detecting head 20 further includes a data transmission winding 36 and a power-feeding winding 38. A data receiving winding 43 and a power-feeding winding 44 are formed on the first layer of the PCB forming the scale 10 at locations corresponding to the data transmission winding 36 and the power-feeding winding 38 of the detecting head 20. The data transmission winding 36, the power-feeding winding 38, the data receiving winding 43, and the power-feeding winding 44 are hoop coils, respectively. In operation, a magnetic field developed from the data transmission winding 36 is interlinked with the data receiving winding 43, whereby data is transferred between them. A magnetic field from the power-feeding winding 44 is interlinked with the power-feeding winding 38, whereby electric power is fed from the former to the latter. Those windings may be meandering coils, spiral coils or others in place of the hoop coils.

As shown in FIG. 1, the scale 10 includes a DC/AC converter 92 whose output is connected to the power-feeding winding 44. The detecting head 20 includes an AC/DC converter 93 whose input is connected to the power-feeding winding 38. The output of the AC/DC converter 93 is connected to an exciting circuit 50, a receiving circuit 70, a data transmitting circuit 80, and a control circuit 42.

Figure 4:
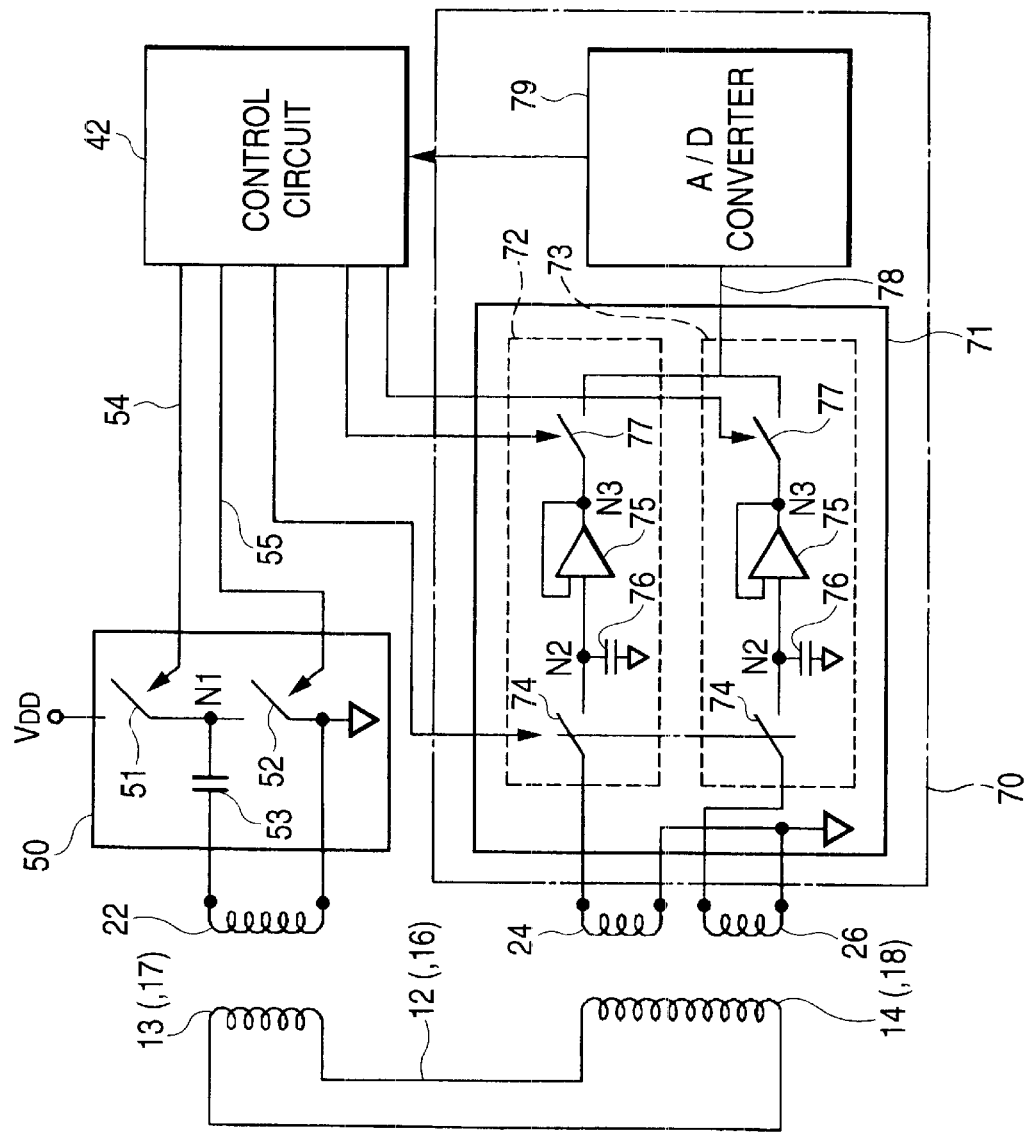
FIG. 4 is a block diagram showing details of an electrical arrangement of the first embodiment.

The terminals of the transmission winding 22 are connected to the output of the exciting circuit 50. The exciting circuit 50 responds to a pulse signal from the control circuit 42, and supplies a time-varying exciting signal to the terminals of the transmission winding 22. The exciting signal is preferably a sinusoidal signal at high frequency, a pulse signal, or a sinusoidal signal that exponentially attenuates. The exciting circuit 50, as shown in FIG. 4, includes a first switch 51 and a second switch 52 connected in series between a supply voltage $V_{DD}$ and ground. A capacitor 53 is connected at one end to a connection node N1 between the switches 51, 52 and, at the other end, to one terminal of the transmission winding 22. The other terminal of the transmission winding 22 is grounded. With such a connection, the transmission winding 22 serves as an inductor that is combined with the capacitor 53 to form an LC resonance circuit. The exciting circuit 50 intermittently excites the transmission winding 22 with the aid of the switches 51, 52, which are controlled by pulse signals 54, 55 provided from the control circuit 42.

The transmission winding 22 is indirectly and inductively coupled to the two receiving windings 24, 26 through the coupling loops 12, 16 on the scale 10. The receiving windings 24, 26 are connected to the receiving circuit 70. The receiving circuit 70, as shown in FIG. 4, includes a sample/hold circuit 71 and an A/D converter 79. An output signal of the receiving winding 24 is connected to a sample/ hold sub-circuit 72, and an output signal of the receiving winding 26 is connected to a sample/hold sub-circuit 73. The sample/hold sub-circuits 72, 73 contain switches 74 for receiving the output signals of the receiving windings 24, 26, respectively, and perform sampling operation in synchronism with the pulse signal that controls the exciting circuit 50. The output terminal of the switch 74 is connected to a positive input terminal of a buffer amplifier 75. One end of a sample/hold capacitor 76 is connected to a connection node N2 between the switch 74 and the buffer amplifier 75, and the other end thereof is grounded. A negative input terminal of the buffer amplifier 75 is connected to an output node N3 of the buffer amplifier 75.

Switches 77 of the two sample/hold sub-circuits 72, 73 are connected together to an output line 78, which in turn is connected to the input terminal of the A/D converter 79. The A/D converter 79 converts an analog signal output from the sample/hold circuit 71 into a corresponding digital signal. The digitized signal is then transferred to the control circuit 42. Sampling timings of the sample/hold sub-circuits 72, 73 are determined allowing for predicted delay characteristics in the exciting circuit 50, the transmission winding 22 excited by the exciting circuit 50, and the receiving windings 24, 26 that respond to varying magnetic fluxes developed from the transmission winding 22.

The control circuit 42 contains a microprocessor and controls an overall operation of the detecting head 20. Particularly, the control circuit 42 outputs pulse signals to the exciting circuit 50 and the receiving circuit 70 for controlling them. The control circuit 42 computes a position of the detecting head 20 relative to an origin point by using a digital signal from the receiving circuit 70, and transfers the computed relative position in the form of serial digital data to the data transmitting circuit 80.

Returning to FIG. 1, one of the outputs of the data transmitting circuit 80 is connected to the data transmission winding 36, and the other output is connected to an input/output connector 96. In the embodiment under discussion, the signal is converted into a serial signal in the control circuit 42. In a case where the output signals of the control circuit 42 are parallel signals, circuitry for converting the parallel signals into a serial signal is provided in the data transmitting circuit 80.

The data receiving winding 43 of the scale 10 is connected to a data receiving circuit 82. The input of the DC/AC converter 92 and the output of the data receiving circuit 82 are connected to an input/output connector 94 provided on the scale 10.

The input/output connectors 94, 96 are each provided with a signal terminal (data transfer terminal) and a power feeding terminal, and have the same configuration. Further, each of those may be fit to a receiving-side connector 98. The receiving-side connector 98 is coupled to the NC controller 46 of the NC machine tool so that it transfers the measured value as numerical data to the NC controller 46.

The individual positions within one wavelength are definitely specified by the control circuit 42. The control circuit 42 further contains a memory for storing moving directions of the head and the number of wavelengths that the head passed. The control circuit 42 determines all the individual positions relative to an origin point of the detecting head 20 by the utilization of the memory. Specifically, in the illustrated embodiment, an interpolated number (=4) is obtained by processing the output signals of the first and second receiving windings 24, 26, which are phase shifted from each other by λ/4. If an appropriate interpolating circuit is provided, a position measurement of higher resolution is secured.

Figure 5A:
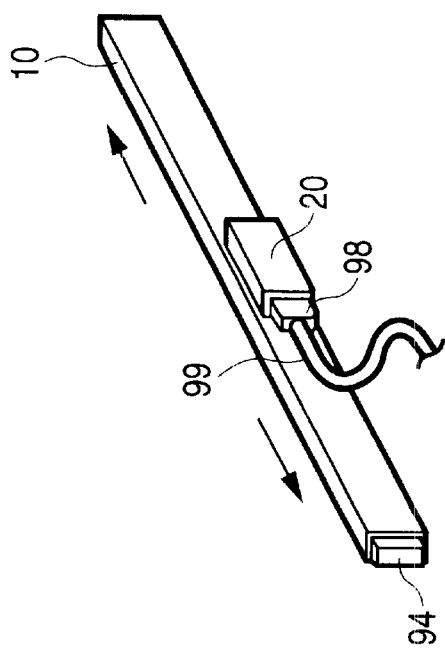
FIGS. 5A and 5B are perspective views showing how to use the first embodiment.

Operation of the first embodiment thus arranged will be described hereunder. To operate, as shown in FIG. 5A, the receiving-side connector 98 is connected to the input/output connector 94 (not seen in FIG. 5A since it is hidden by the receiving-side connector 98 fit thereto) of the scale 10, and in this state, electric power is fed from the NC controller 46 to the displacement detecting device. In turn, the DC/AC converter 92 receives the power and converts it into an AC power, and feeds the AC power to the power-feeding winding 44.

The power-feeding winding 44 develops a magnetic field, which is interlinked with the power-feeding winding 38. The AC/DC converter 93 receives the AC power from the power-feeding winding 38 and converts it into a DC power and feeds the converted DC power to the control circuit 42, the exciting circuit 50, the receiving circuit 70, and the data transmitting circuit 80. The exciting circuit 50 responds to a pulse signal from the control circuit 42 to supply an exciting signal varying with time to the terminals of the transmission winding 22. The transmission winding 22 develops a primary magnetic field that rises from the inside of it on the paper surface of FIG. 2 and falls to the outside of it (the winding 22) on the paper surface of FIG. 2.

The first loop parts 13, 17 of the first coupling loops 12, 16, which are under the transmission winding 22, respond to the primary magnetic field developed by the transmission winding 22, and generate induced electromagnetic forces that cause currents and magnetic fields in a direction to decrease the magnitude of the primary magnetic field. When the transmission winding current flows in the counterclockwise direction, as shown in FIG. 2, the induced currents of the first loop parts 13, 17 of the first coupling loops 12, 16 flow in the clockwise direction. The current in the second loop part 14 of the first coupling loop 12 likewise flows in the clockwise direction, while the current in the second loop part 18 of the second coupling loop 16 flows in the counterclockwise direction because of the presence of the cross wiring 19.

Accordingly, the second loop parts 14, 18 develop secondary magnetic fields such that the opposite magnetic polarity repeatedly appears at given periods along the scale 10 under the receiving windings 24, 26 of the detecting head 20. The secondary magnetic fields have each a wavelength equal to the period of the second loop parts 14, 18, and are shifted from each other by λ/4. Therefore, when the detecting head 20 is moved along the scale 10, the first and second receiving windings 24, 26 each generate a voltage signal as a periodic function of the wavelength λ in accordance with a quantity of its movement, i.e., a displacement.

The voltage signal is transferred from the receiving circuit 70 to the control circuit 42, and the control circuit 42 then converts the voltage signal into a serial digital signal and outputs the converted serial digital signal to the data transmitting circuit 80. In turn, the data transmitting circuit 80 amplifies the received signal and outputs the amplified signal to the data transmission winding 36. Then, the data receiving winding 43, which is magnetically coupled with the data transmission winding 36, transmits the signal to the data receiving circuit 82. The signal is transmitted in the form of numerical data to the NC controller 46 of the NC machine tool, by way of the input/output connector 94 and the receiving-side connector 98. The operation description thus far made is the description of the case where the receiving-side connector 98 is connected to the input/output connector 94 of the scale 10.

Figure 5B:
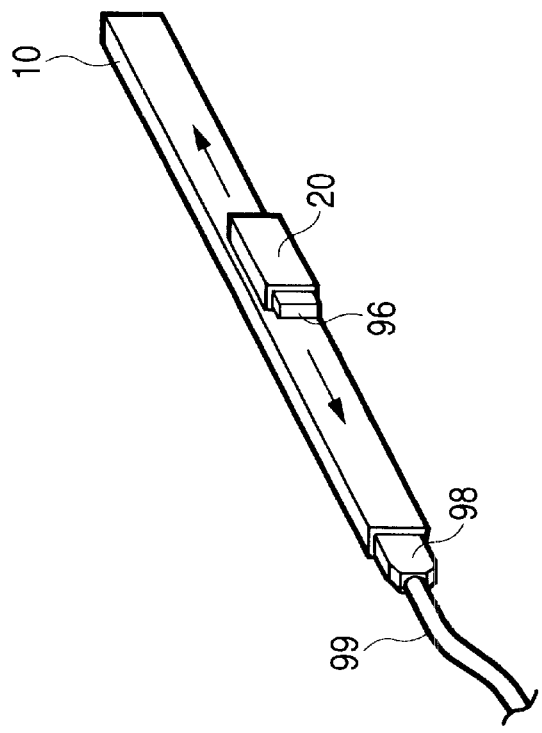

The description to follow is an operation of the displacement detecting device in a case where, as shown in FIG. 5B, the receiving-side connector 98 is connected to the input/output connector 96 of the detecting head 20 (the connector 96 is hidden in the figure since the receiving-side connector 98 is fit to the connector). In this case, electric power output from the NC controller 46 is directly fed to the control circuit 42, the exciting circuit 50, the receiving circuit 70, and the data transmitting circuit 80. The exciting circuit 50 responds to a pulse signal from the control circuit 42 and outputs an exciting signal. In turn, the transmission winding 22 develops a primary magnetic field, and the coupling loops 12, 16 develop secondary magnetic fields. The secondary magnetic fields induce voltages in the first and second receiving windings 24, 26 that vary with a displacement of the detecting head. Each voltage signal detected by the receiving circuit 70 is converted into a serial digital signal by the control circuit 42. The digital signal is then output from the other output of the data transmitting circuit 80 to the input/output connector 96. Finally, the signal is output to the NC controller 46 by way of the receiving-side connector 98.

When the receiving-side connector 98 is connected to the input/output connector 96 of the detecting head 20, the data receiving circuit 82 and the DC/AC converter 92 in the scale 10 are not used. Accordingly, a manual switch may be provided for the purpose of reducing power consumption and suppressing noise generation. The input/output connector 94 may contain a mechanical switch operating such that, when the receiving-side connector 98 is inserted into the input/output connector 94, the data receiving circuit 82 and the DC/AC converter 92 are automatically turned on, and when the input/output connector 94 is removed, the data receiving circuit 82 and the DC/AC converter 92 are automatically turned off.

As described above, in the present embodiment the input/output connectors 94, 96 are provided in the scale 10 and the detecting head 20, respectively. Each of those connectors outputs a displacement signal dependent on a displacement of the detecting head relative to the scale. The input/output connectors 94 and 96 are each configured so as to be fit to the common receiving-side connector 98. The input/output connector 94 of the scale 10 or the input/output connector 96 of the detecting head 20 may be selected as a counterpart connector of the receiving-side connector 98, depending on the way the device is used and the mounting space available.

This feature brings about the following advantages when either of the scale 10 and the detecting head 20, which is fixed in use, is connected to the receiving-side connector 98. There is no chance of disconnecting a receiving-side cable 99 for the receiving-side connector 98 by movement of the counterpart of the fixed member. This results in improvement of the reliability. Additionally, the device is operable at high speed since the movable member is not restricted in its motion by the cable 99. In a case where the displacement detecting device of the invention is applied to a length measuring instrument or a machine tool for the purpose of higher precision measurement, it is preferable that the scale 10, which is long, is fixed to a movable part, and the detecting head 20 is fixed to a fixed part.

In the first embodiment, the data transmitting circuit 80 and the data receiving circuit 82 are provided in the detecting head 20 and the scale 10, respectively, and the data is transferred between the detecting head 20 and the scale 10. The first embodiment may be modified such that the combination of the control circuit 42, the exciting circuit 50, receiving circuit 70, and the coupling loops 12, 16 is provided in each of the scale 10 and the detecting head 20. The first embodiment has an advantage of construction simplification since the receiving circuit 70 for generating the displacement signal depending on a member displacement and the data transmitting circuit 80 for transmitting the displacement signal are provided in the detecting head 20, and the data receiving circuit 82 for receiving the displacement signal from the data transmitting circuit 80 is provided in the scale 10.

A wire communication may be employed for transferring data between the scale 10 and the detecting head 20 by way of a wire connected therebetween. In the first embodiment, the data is transferred between the scale 10 and the detecting head 20 in a wireless manner. This feature eliminates the problems of communication wire disconnection and head movement restriction by the weight of the communication wire.

In an alternative, an electrical contact means may be used for the data transfer between the scale 10 and the detecting head 20. In a specific example of the contact structure, a rail-like sliding contact extends over the entire length of the scale 10. A brush-like sliding member is provided on the detecting head 20. The sliding member is constantly and slidably received on the rail-like sliding contact. This alternative, however, is somewhat inferior in its measurement precision as compared to electromagnetic induction since contact resistance by the brush-like sliding element is inevitably present.

Further, the input/output connectors 94, 96 each include the signal terminal and the power feeding terminal. In a case where the receiving-side connector 98 is connected to the input/output connector 94, and also in a case where it is connected to the input/output connector 96, the electrical connection for deriving a signal and the electrical connection for feeding electric power are both made by one operation.

Moreover, electric power is supplied from the scale 10 to the detecting head 20 by the power-feeding windings 44, 38. The detecting head 20 is driven by the supplied electric power, and performs the detecting operation. Accordingly, there is no need to use a cable for supplying electric power to the detecting head 20.

The first embodiment of the invention uses electromagnetic induction for the power supplying section. Contact transmitting means based on the electrical contact may be used in place of electromagnetic induction. Specifically, a rail-like sliding contact extends over the entire length of the scale 10. A brush-like sliding member is provided on the detecting head 20. The sliding member is constantly and slidably received on the rail-like sliding contact. The contact transmitting means is somewhat inferior in its measurement precision to the electromagnetic-induction basis transmission since contact resistance by the brush-like sliding element is inevitably present. However, it is advantageous in that the construction is simplified and the device size is reduced.

In both cases of using the electromagnetic induction for the electrical power supplying, and using the contact transmitting means for the same purpose, electrical power may be supplied in every attitude of the detecting head, both before and after displacement. Further, electrical power may be supplied to the detecting head only when it takes a standby attitude. Specifically, the power-feeding winding 44 is provided only at a position on the entire length of the scale 10 that is confronted with a standby position (home position) of the detecting head 20 in a device to be measured. A battery, which serves as a secondary battery, is mounted on the detecting head 20. The battery of the detecting head 20 is charged through the power-feeding winding 44 (or the contact transmitting means) while the detecting head 20 stays at the standby position. This case has the advantage that there is no need to provide the power supplying section extending over the entire length of the scale 10.

Figure 6:
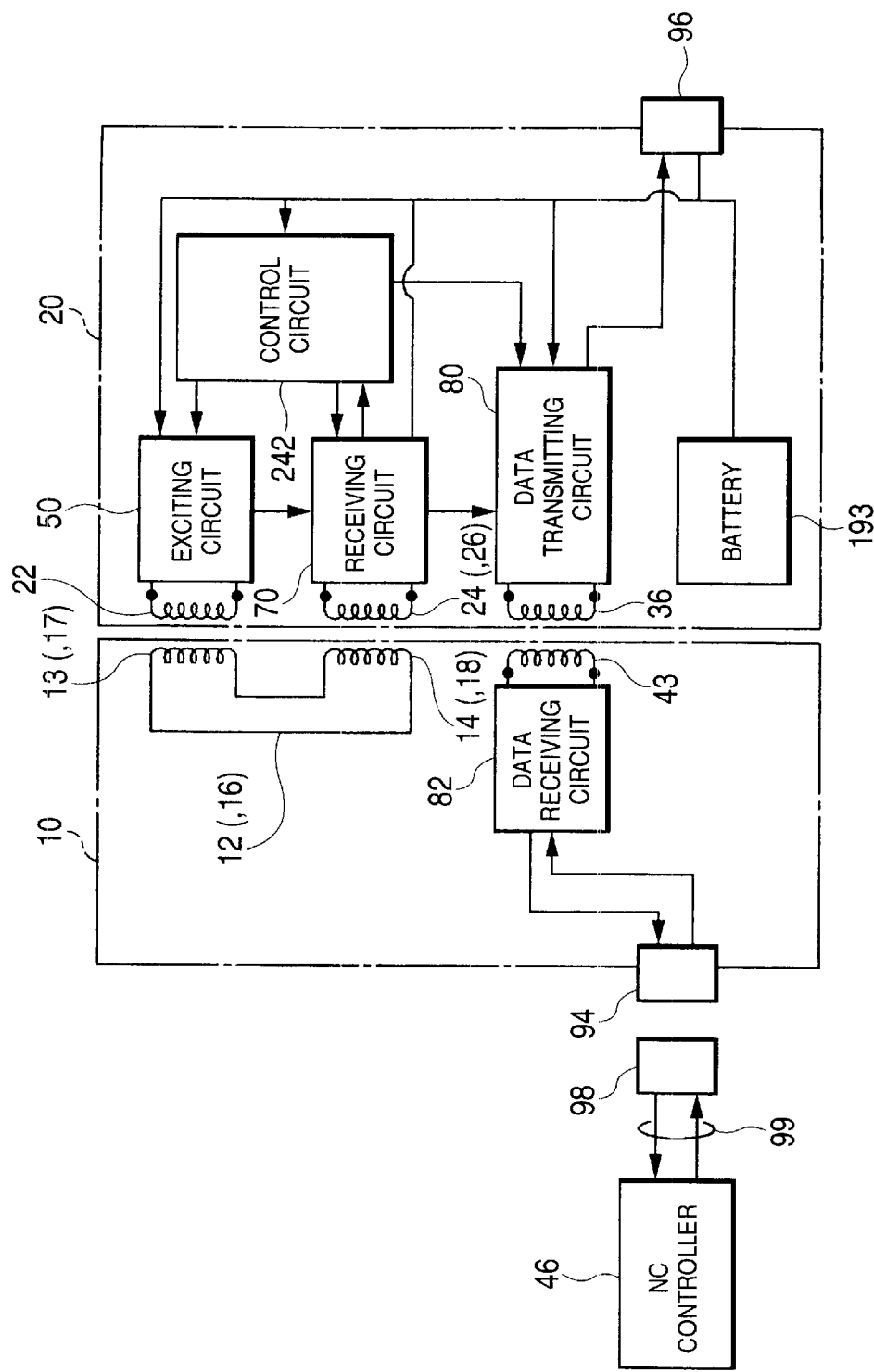
FIG. 6 is a block diagram showing a displacement detecting device according to a second embodiment of the present invention.

A second embodiment of the present invention will be described hereinafter with reference to FIG. 6, which corresponds to the simplified first embodiment. In the second embodiment, electric power is not supplied from the scale 10 to the detecting head 20. Instead, a battery 193, which serves as a primary battery, is provided on the detecting head 20. The detecting head 20 is driven by the electric power of the battery, and performs the displacement detecting operation. In FIG. 6, the detecting head 20 further includes a control circuit 242, an exciting circuit 50, a transmission winding 22, an input/output connector 96, and the battery 193 as a primary battery. The scale 10 includes coupling loops 12, 16, a data receiving winding 43, a data receiving circuit 82, an input/output connector 94, as in the first embodiment.

When the receiving-side connector 98 is connected to the input/output connector 94 of the scale 10, electric power is supplied from the battery 193 to the control circuit 242, exciting circuit 50, receiving circuit 70, and the transmitting circuit 80. An output signal of the exciting circuit 50 excites the transmission winding 22, which in turn develops a primary magnetic field. In turn, the coupling loops 12, 16 develop secondary magnetic fields. The secondary magnetic fields induce voltages in the receiving windings 24, 26 representative of detecting head displacement. Each voltage signal detected by the receiving circuit 70 is input to the control circuit 242. In the control circuit 242, the voltage signal is converted into a serial digital signal, and the converted serial digital signal is transferred to the data transmitting circuit 80 and output to the data transmission winding 36. A magnetic field developed by the data transmission winding 36 induces a voltage in the data receiving winding 43, and the induced voltage is detected by the data receiving circuit 82. The data receiving circuit 82, which is supplied with electrical power from the NC controller 46, outputs the detected signal to the input/output connector 94 and the NC controller 46.

When the receiving-side connector 98 is connected to the input/output connector 96 of the detecting head 20, electric power is supplied from the NC controller 46 directly to the control circuit 242, the receiving circuit 70, and the data transmitting circuit 80. The transmission winding 22 receives an output signal from the exciting circuit 50 and develops a primary magnetic field. In turn, the coupling loops 12, 16 develop secondary magnetic fields. The secondary magnetic fields induce voltages in the receiving windings 24, 26 that vary with a head displacement. Each voltage signal detected by the receiving circuit 70 is input to the control circuit 242. The control circuit 242 converts the voltage signal into a digital signal and the converted digital signal is input to the data transmitting circuit 80. Then, the data transmitting circuit 80 outputs the data signal to the input/output connector 96 and the NC controller 46.

The second embodiment is not provided with a circuit for supplying electric power to the detecting head 20. Therefore, the displacement detecting device is free from the problems arising from the supply of power, such as power loss and unstable power. The second embodiment needs the management of the battery discharging, e.g., the battery is replaced with a new one at a predetermined time interval. However, the second embodiment does not need the structure required for the charging. This feature makes the device extremely simple in construction and small in size.

The second embodiment may be modified such that the detecting head 20 is not provided with the input/output connector 96. In this modification, it is impossible to connect the receiving-side connector 98 to the detecting head 20. However, where the detecting head 20 is fixed to the movable member in use, there is no chance of disconnecting a receiving-side cable for the receiving-side connector by the movement of the detecting head 20, and the detecting head 20 is operable at high speed, as in the first embodiment.

While the second embodiment uses the battery 193 as a primary battery, a secondary battery or a capacitance of a large capacity may be used instead. In this case, a power-feeding winding or a charging device is provided only at a position on the entire length of the scale 10 that corresponds with a standby position (home position) of the detecting head 20 in a device to be measured. The battery is charged while the detecting head 20 is in the standby position. If required, a solar battery cell may be used.

Figure 7:
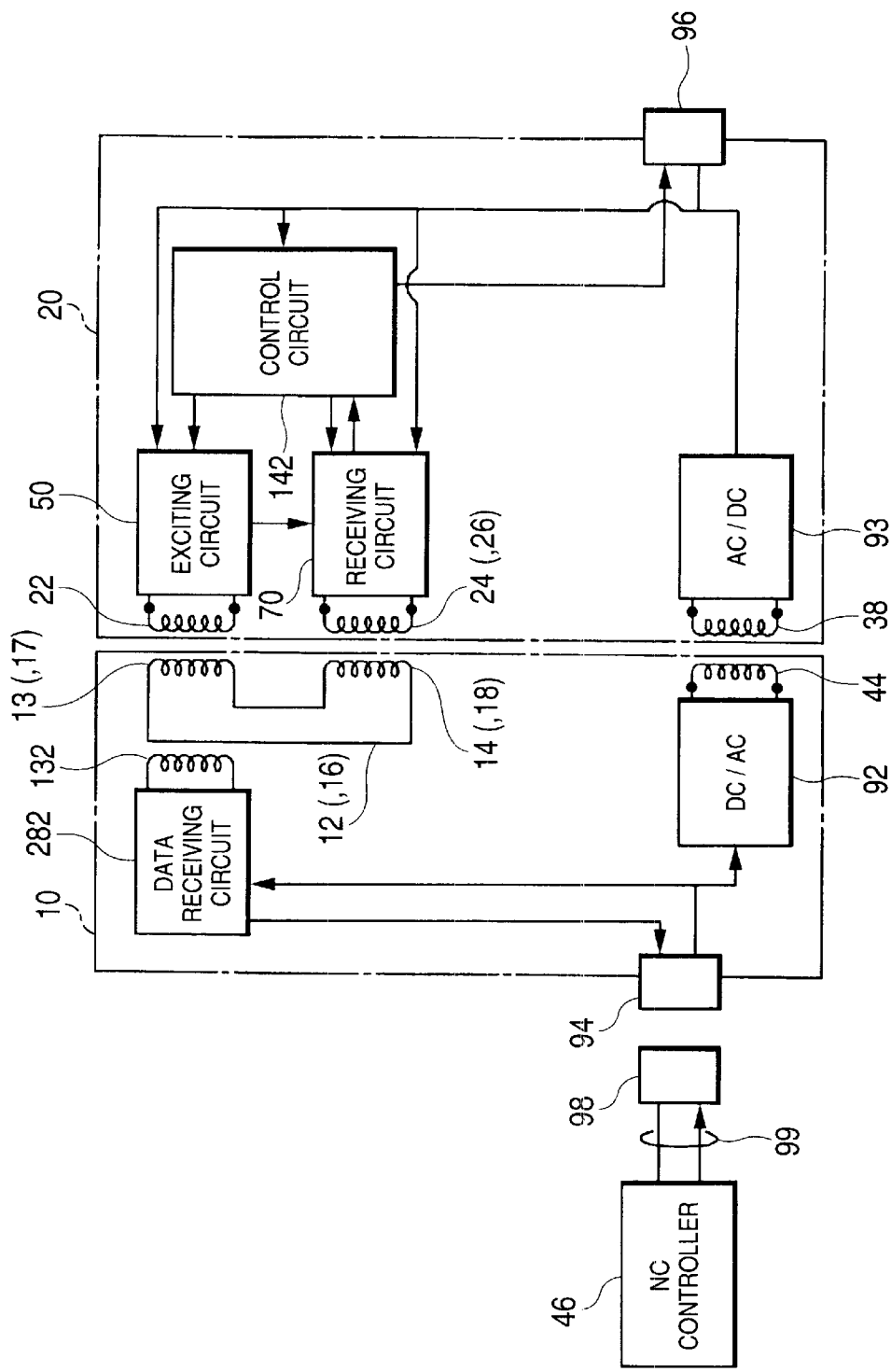
FIG. 7 is a block diagram showing a displacement detecting device according to a third embodiment of the present invention.
Figure 8:
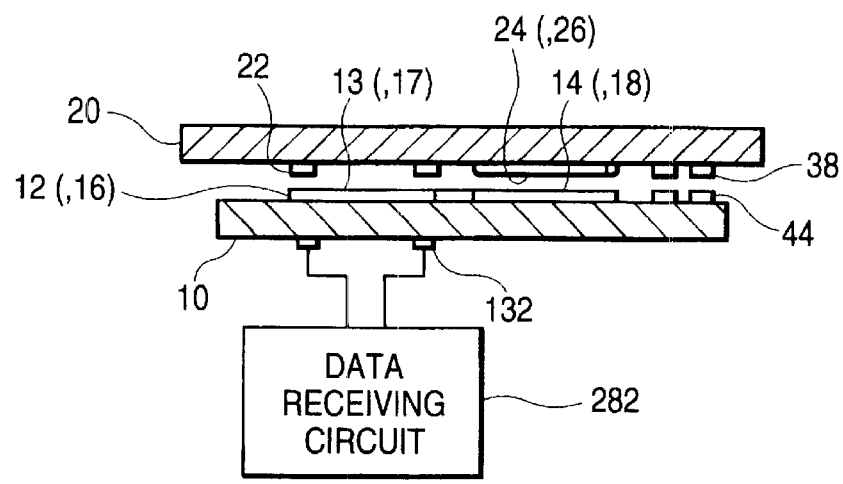
FIG. 8 is a side view, partly cut out, showing a key portion of the third embodiment.
Figure 9:
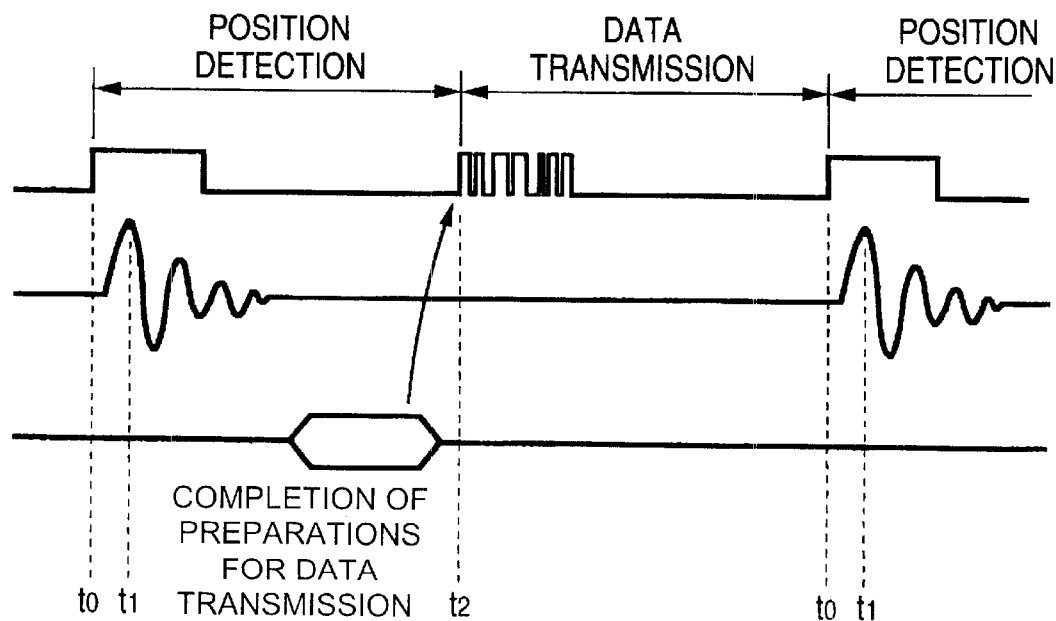
FIG. 9 is a timing diagram showing signals in the third embodiment.

A third embodiment of the present invention will be described hereinafter with reference to FIGS. 7–9, and is arranged such that the data transmitting circuit 80 and the data transmission winding 36, which are used in the first embodiment, are not used, and the exciting circuit 50 has an additional function to transmit data. As shown in FIG. 8, a data receiving winding 132 formed as a hoop coil like the data receiving winding 43 in the first embodiment is disposed on the reverse side of the first loop parts 13, 17 of the coupling loops 12, 16. The output of the data receiving circuit 132 is connected to a data receiving circuit 282. The output of the data receiving circuit 282 is connected to the input/output connector 94. A control circuit 142 converts a signal that is output from the receiving circuit 70 into a serial digital signal. The remaining construction of the third embodiment is substantially the same as that of the first embodiment, and will not be repeated hereafter.

When the receiving-side connector 98 is connected to the input/output connector 94 of the scale 10, the electric power supplied from the NC controller 46 is supplied to the DC/AC converter 92 and the AC/DC converter 93, and then to the control circuit 142, the exciting circuit 50, and the receiving circuit 70. The output signal of the exciting circuit 50 excites the transmission winding 22 to develop a primary magnetic field, and in turn secondary magnetic fields are developed by the coupling loops 12, 16. The secondary magnetic fields induce voltages in the receiving windings 24, 26 that vary with head displacement. Each of the voltage signals is detected by the receiving circuit 70 and input to the control circuit 142. The voltage signal is converted into a serial signal by the control circuit 142, and the converted serial signal is input to the exciting circuit 50 and then to the transmission winding 22. A magnetic field developed from the transmission winding 22 induces a voltage in the data receiving winding 132, and the induced voltage is detected by the data receiving circuit 282. The voltage signal output from the data receiving circuit 282 is applied to the input/output connector 94 and the NC controller 46.

The exciting circuit 50 is operated in a time-division manner. As shown in FIG. 9, the operation for the position detection and the data conversion is performed within a predetermined time segment, and the data transmitting operation is performed within a subsequent predetermined time segment. These operations are alternately repeated. For the time divisional operation of the exciting circuit, a pulse signal (the uppermost waveform in FIG. 9) is applied from the control circuit 142 to the exciting circuit 50. The position detecting operation starts at a time point t0. Responsively, an LC resonance circuit contained in the exciting circuit 50 generates a resonance signal attenuating with time. The resonance signal is detected by the receiving windings 24, 26 and the receiving circuit 70, and input to the control circuit 142. The control circuit 142 detects a top peak of the waveform of the resonance signal (see a medium waveform in FIG. 9). Within a predetermined time period starting from a time point t1 of the top peak, an operation for preparing the data transmission is carried out. Namely, the operation for the position detection and the data conversion to the serial data is performed. Upon completion of the data transmission preparation, the control circuit 142 starts to output a pulse signal containing data to the exciting circuit 50, at a time point t2.

When the receiving-side connector 98 is connected to the input/output connector 96 of the detecting head 20, the electric power supplied from the NC controller 46 is directly supplied to the control circuit 142, the exciting circuit 50, and the receiving circuit 70. When the transmission winding 22 is excited by the output signal of the exciting circuit 50 to develop a primary magnetic field, the coupling loops 12, 16 develop secondary magnetic fields, which in turn induce voltages in the receiving windings 24, 26 that vary with head displacement. Each of voltage signals is detected by the receiving circuit 70 and input to the control circuit 142. The control circuit 142 converts the voltage signal into a serial digital signal. The converted serial digital signal is input to the input/output connector 96 and the NC controller 46.

In the third embodiment, the data transmission winding 36 used in the first embodiment is not used. This feature leads to the reduction of the number of required parts and the device size. When viewed from an angle of the manufacturing cost, it is preferable to form the data receiving winding 132 on the reverse side of the PCB, as shown in FIG. 8. If required, the data receiving winding 132 may instead be formed in a multi-layer PCB.

Figure 10:
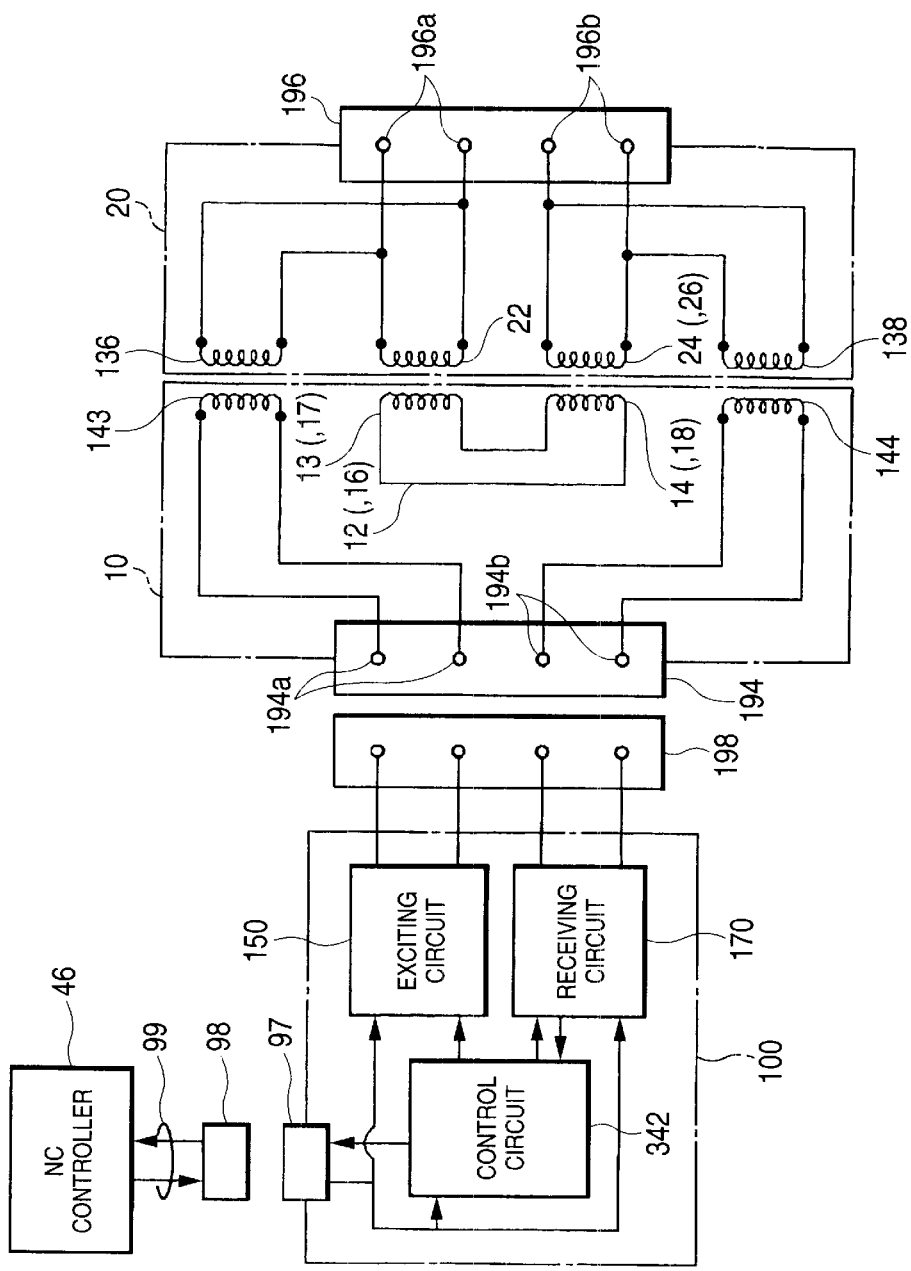
FIG. 10 is a block diagram showing a displacement detecting device according to a fourth embodiment of the present invention.

A fourth embodiment of the present invention will be described hereafter with reference to FIG. 10, wherein an external unit 100 is used for the detecting head 20, and electronic components are not incorporated into the detecting head 20. In FIG. 10, a relay winding 143 is provided in the scale 10 and a relay winding 136 for the detecting head 20 is provided for the purpose of exciting signal transmission. A relay winding 144 is provided in the scale 10 and a relay winding 138 is provided in the detecting head 20 for the purpose of the detected signal transmission. The relay windings 136, 138, 143, and 144 are hoop coils. Meandering coils or spiral coils may be used in place of the hoop coils.

Coupling loops 12, 16, similar to those in the first embodiment, are provided in the scale 10. The relay windings 143, 144 are connected to an input/output connector 194.

In the detecting head 20, the terminal of the transmission winding 22 and the terminals of the receiving windings 24, 26 are connected to an input/output connector 196. The terminal of the relay winding 136 is branched and connected to the transmission winding 22, and the terminal of the relay winding 138 is branched and connected to the receiving windings 24, 26.

The input/output connectors 194, 196 have the same configuration. Further, each of the input/output connectors 194, 196 may be fit to a receiving-side connector 198. The input/output connector 194,196 includes exciting terminals 194a, 196a connected to the relay windings 143, 136 for the exciting and signal terminals 194b, 196b connected to the relay winding 144, 138 for deriving the signal.

The external unit 100 includes an exciting circuit 150, a receiving circuit 170, and a control circuit 342, and further includes an external connector 97 to be connected to the receiving-side connector 98 of the receiving-side cable 99 extending from the NC controller 46.

The displacement detecting device of the fourth embodiment is used in a state that the receiving-side connector 98 is connected to the external connector 97 of the external unit 100. Electric power supplied from the NC controller 46 is supplied to the control circuit 342, exciting circuit 150, and the receiving circuit 170.

When the receiving-side connector 198 of the external unit 100 is connected to the input/output connector 194 of the scale 10, the output signal of the exciting circuit 150 is applied through the relay windings 143, 136 to the transmission winding 22, which in turn develops a primary magnetic field. Responsively, the coupling loops 12, 16 develop secondary magnetic fields, which induce voltages in the receiving windings 24, 26 that vary with head displacement. Each of the voltage signals is detected by the receiving circuit 170 via the relay windings 138, 144. The signal output from the receiving circuit 170 is applied to the control circuit 342, which then converts it into a serial digital signal. The converted serial digital signal is output to the external connector 97 and the NC controller 46.

When the receiving-side connector 198 is connected to the input/output connector 196 of the detecting head 20, the output signal of the exciting circuit 150 directly excites the transmission winding 22 to develop a primary magnetic field. The coupling loops 12, 16 respond to the primary magnetic field to develop secondary magnetic fields. The secondary magnetic fields induce voltages in the receiving windings 24, 26 that vary with head displacement. The induced voltage signals are input to the receiving circuit 170 via the input/output connector 196. The signal detected by the receiving circuit 170 is converted into a serial digital signal by the control circuit 142, and the converted serial digital signal is then output to the external connector 97 and the NC controller 46.

The fourth embodiment uses the relay windings 136, 138, 143, and 144. Accordingly, when the receiving-side connector 198 is connected to the input/output connector 194, the signal attenuation and the signal delay are present while those are negligible in a case where the receiving side connector 198 is connected to the input/output connector 196. In a preferable measure to be taken for this, the exciting circuit 150 is arranged such that an amplifier is added to the exciting circuit 50 in the first embodiment. A setting section for selecting a desired signal delay time is preferably added to the control circuit 342. In this case, a manual switch may be provided, which allows the amplifier and the setting section to operate only when the receiving-side connector 198 is connected to the input/output connector 194. Further, a mechanical switch may be assembled to the input/output connector 194 for the purpose of automating the above select operations. Specifically, where the mechanical switch is used, when the receiving-side connector 198 is inserted into the input/output connector 194, the amplifier is turned on, and a long delay time is selected. When the input/output connector 194 is pulled out, the amplifier is turned off and a short delay time is selected.

In the fourth embodiment, the external unit 100 is used for the detecting head 20, and electronic components are not incorporated into the detecting head 20. Accordingly, the detecting head 20 may be constructed to be extremely small and heavy duty. If trouble occurs in the external unit 100, the operator will have to replace the external unit with a new external unit 100. Accordingly, in this case, there is no need of halting the manufacturing line in operation.

Figure 11:
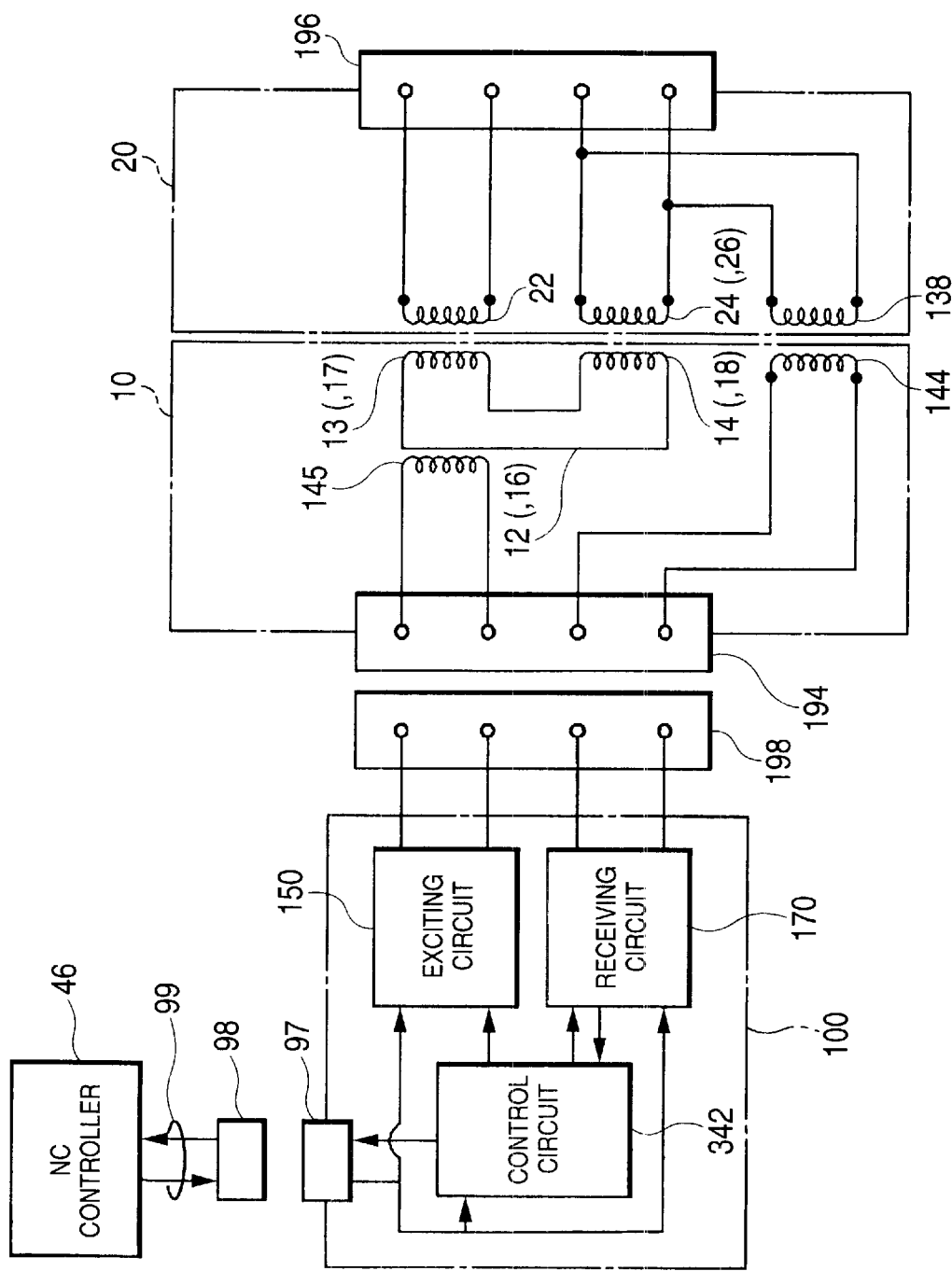
FIG. 11 is a block diagram showing a modification of the fourth embodiment.

The relay windings 136, 143 in the fourth embodiment, as shown in FIG. 11, may be replaced with an exciting winding 145 as a hoop coil, which is provided on the reverse side of the first loop parts 13, 17 of the coupling loops 12, 16, while being extended over the entire length of the scale 10. In this case, when the receiving-side connector 198 is connected to the input/output connector 194 of the scale 10, an output signal of the exciting circuit 150 excites the exciting winding 145 to develop a primary magnetic field. In turn, the coupling loops 12, 16 responsively develop secondary magnetic fields. The secondary magnetic fields induce voltages in the receiving windings 24, 26 that vary with head displacement. Each of the voltage signals is detected by the receiving circuit 170 through the relay windings 138, 144. When the receiving-side connector 198 is connected to the input/output connector 196 of the detecting head 20, the output signal of the exciting circuit 150 is directly applied to the transmission winding 22, which in turn develops a primary magnetic field. In response to the primary magnetic field, the coupling loops 12, 16 develop secondary magnetic fields. The secondary magnetic fields induce voltages in the receiving windings 24, 26 that vary with head displacement. Each of voltage signals is input to the receiving circuit 170 via the input/output connector 196. In this modification of the fourth embodiment, power loss is small and the signal delay is small since the relay windings 136, 143 are not used.

The external unit 100 including the exciting circuit 150, the receiving circuit 170, and the control circuit 342 is used in the fourth embodiment and its modification. If required, the exciting circuit 150, the receiving circuit 170, and the control circuit 342 may be provided in the NC controller 46.

Figure 12:
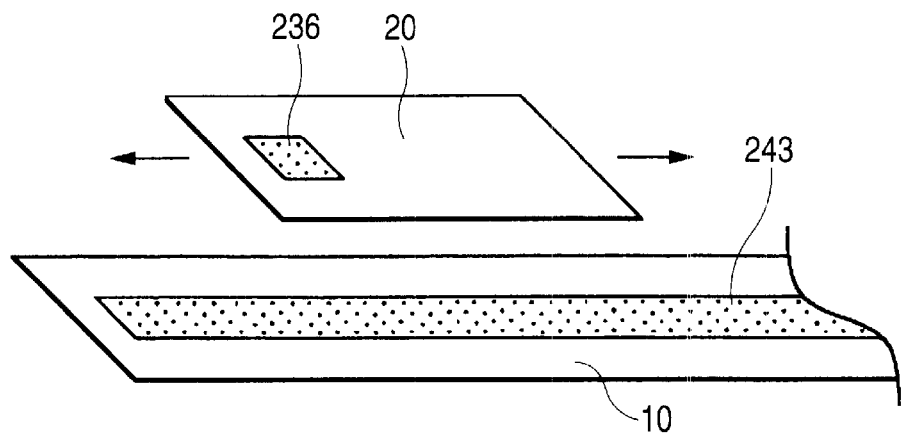
FIG. 12 is a side view showing another modification of a structural arrangement for handling data transmission and reception.

In each embodiment mentioned above, the electromagnetic induction is used for the data transfer from the detecting head 20 to the scale 10. A capacitance may be used instead of the electromagnetic induction. Specifically, as shown in FIG. 12, a detecting conductive member 243 is used in place of the data receiving winding 43, and extends over the entire length of the scale 10. A data transfer conductive member 236 is used in place of the data transmission winding 36 and is disposed on the under side of the detecting head 20. This data transfer construction thus arranged produces the effects comparable with those of the electromagnetic-induction basis data transfer construction.

Figure 13:
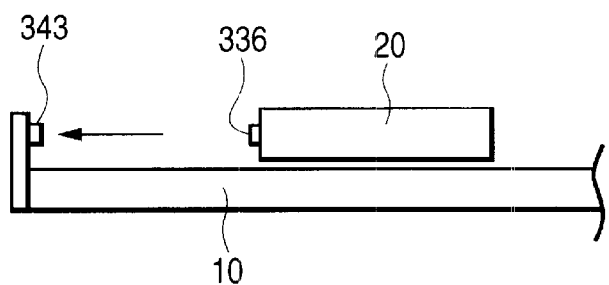
FIG. 13 is a side view showing another modification of another structural arrangement for handling data transmission and reception.

An optical signal may be used for transferring data from the detecting head 20 to the scale 10. As shown in FIG. 13, a light receiving part 343 of a photo diode, CCD (charge coupled device) or the like is provided in the scale 10, in place of the data receiving winding 43. A light emitting part 336 is used in place of the data transmission winding 36, and is disposed facing the light receiving part 343. This data transfer construction also produces effects comparable with those using electromagnetic induction. In this case, visible light, infrared light, or a laser light may be used for the optical communication.

Figure 14:
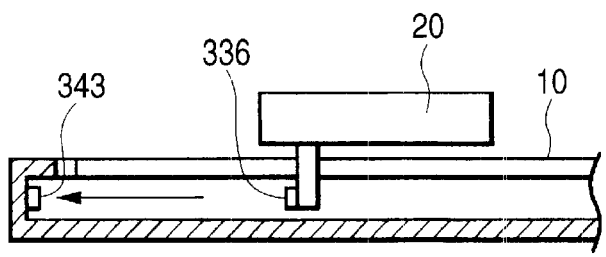
FIG. 14 is a side view showing another modification of yet another structural arrangement for handling data transmission and reception.

As shown in FIG. 14, the scale 10 may be formed like a box. The detecting head 20 may be provided with a downwardly extending arm. The arm is inserted into a groove formed in the scale 10. A light emitting part 336 is provided at the bottom end of the arm, and a light receiving part 343 is provided on the inner surface of the scale 10. In this case, a dust-proof function is secured.

An ultrasonic signal may be used for the data transfer from the detecting head 20 to the scale 10. This data transfer construction is well adaptable for a case where the scale 10 and the detecting head 20 are placed in a fluid, such as for an operating point detection in the hydraulic cylinder.

It is preferable to use a cylindrical electromagnetic shield surrounding a space between the scale 10 and the detecting head 20.

The linear motion displacement detecting device whose measurement axis is linear has been discussed in the above-mentioned embodiments. It is evident that the present invention may be applied to an angle sensor or a rotation sensor, both having an arcuate measurement axis.

In the above-mentioned embodiments, the displacement detecting device is applied to the NC machine tool. The displacement detecting device may be connected at the output to another type of receiving-side device, such as a display device or a recording device. That is, the displacement detecting device may be coupled to any type of receiving-side device that uses data indicative of a detected displacement of a movable member.

The displacement detecting devices of the embodiments are of the induction type utilizing the electromagnetic induction. It will be readily understood that the invention may be applied to the displacement detecting device of the optical or electrostatic type. Further, it may be applied to the displacement detecting device of the magnetic type in which N and S poles of a permanent magnet are alternately arranged on the scale, and a displacement is detected by a magnetic head or a magnetic resistance element head, which is moved along the scale.

What is claimed is:

1. A displacement detecting device for detecting a relative displacement between a first member and a second member, wherein said first member includes a first output connector for outputting a displacement signal based upon the relative displacement, and said second member includes a second output connector for outputting the displacement signal, and wherein the first and second output connectors are adapted to be connected to a receiving-side connector that receives the output displacement signal.

2. The displacement detecting device according to claim 1, wherein said first member includes a displacement signal generating section for generating the displacement signal and a transmitting circuit for transmitting the displacement signal, and said second member includes a receiving circuit for receiving the displacement signal from the transmitting circuit.

3. The displacement detecting device according to claim 2, further comprising non-contact signal transmitting means for transmitting the displacement signal.

4. The displacement detecting device according to claim 3, wherein said non-contact signal transmitting means is based on an electromagnetic induction.

5. The displacement detecting device according to claim 3, wherein said non-contact signal transmitting means is based on a capacitance.

6. The displacement detecting device according to claim 3, wherein said non-contact signal transmitting means is based on an optical signal.

7. The displacement detecting device according to claim 1, wherein said first and second members each include displacement signal generating sections for generating the displacement signal on the basis of the relative displacement.

8. The displacement detecting device according to claim 1, wherein one of said first and second members includes a power supplying section for supplying electric power from said one of said first and second members to the other of said first and second members.

9. The displacement detecting device according to claim 8, wherein the power supply is performed by non-contact signal transmitting means.

10. The displacement detecting device according to claim 9, wherein said non-contact signal transmitting means is based on an electromagnetic induction.

11. The displacement detecting device according to claim 1, wherein each of said first and second output connectors include a signal terminal and a power feeding terminal.

12. A displacement detecting device for detecting a relative displacement between a detecting head and a scale extending over and confronted with the entire range of a locus representative of a movement of said detecting head, wherein said scale includes a connector, said connector incorporating therein an input terminal and an output terminal, said input terminal receives electric power and feeds electric power to said detecting head, and said output terminal receives a displacement signal from said detecting head.

13. The displacement detecting device according to claim 12, wherein said detecting head includes a displacement signal generating section and a transmitting circuit, said displacement signal generating section generating the displacement signal based upon the relative displacement between the detecting head and the scale, and said transmitting circuit transmitting the displacement signal to the scale, and said scale includes a receiving circuit and a power supplying section, said receiving circuit receiving the displacement signal from the transmitting circuit and said power supplying section supplying electric power to said detecting head.

14. The displacement detecting device according to claim 13, wherein the displacement signal transmission is performed by non-contact signal transmitting means.

15. The displacement detecting device according to claim 14, wherein said non-contact signal transmitting means is based on an electromagnetic induction.

16. A displacement detecting device for detecting a relative displacement between a first member and a second member, wherein said first member includes a displacement signal generating section for generating a displacement signal on the basis of the relative displacement and a signal transferring section for transferring the displacement signal to said second member, each of said first and second members including input/output connectors, said input/output connectors having an exciting terminal for receiving an exciting signal and a signal terminal for outputting the displacement signal on the basis of the relative displacement, and wherein an output of the displacement signal generating section is branched and connected to the signal terminal and to the signal transferring section, said input/output connectors being adapted to be fit to a receiving-side connector that receives said output displacement signal.

* * * * *